United States Patent
Chakravarty et al.

(10) Patent No.: US 10,198,694 B2
(45) Date of Patent: Feb. 5, 2019

(54) STATIC POSTURE BASED PERSON IDENTIFICATION

(71) Applicant: Tata Consultancy Services Limited, Mumbai (IN)

(72) Inventors: Kingshuk Chakravarty, Kolkata (IN); Ramu Reddy Vempada, Kolkata (IN); Tanushyam Chattopadhyay, Kolkata (IN); Aniruddha Sinha, Kolkata (IN); Arpan Pal, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 673 days.

(21) Appl. No.: 14/588,595

(22) Filed: Jan. 2, 2015

(65) Prior Publication Data
US 2015/0193686 A1 Jul. 9, 2015

(30) Foreign Application Priority Data

Jan. 3, 2014 (IN) .............................. 31/MUM/2014
Sep. 5, 2014 (IN) ........................... 2551/DEL/2014

(51) Int. Cl.
*G06F 15/18* (2006.01)
*G06N 5/04* (2006.01)
(Continued)

(52) U.S. Cl.
CPC ................. *G06N 5/04* (2013.01); *G01J 5/00* (2013.01); *G06F 21/32* (2013.01);
(Continued)

(58) Field of Classification Search
CPC ............... G06F 21/32; G06K 9/00369; G06K 9/00375; G06K 9/00382; G06N 99/005
(Continued)

(56) References Cited

U.S. PATENT DOCUMENTS

| 8,488,888 B2 | 7/2013 | Balan et al. |
| 2008/0267471 A1* | 10/2008 | Yu ........................ G06K 9/4604 382/128 |

(Continued)

FOREIGN PATENT DOCUMENTS

CN 102867112 1/2013

OTHER PUBLICATIONS

"Human posture recognition using human skeleton provided by Kinect", Thi-Lan Le, Minh-Quoc Nguyen, Thi-Thanh-Mai Nguyen, Computing, Management and Telecommunications (ComManTel), 2013 International Conference on Jan. 21-24, 2013, pp. 340-345.*

(Continued)

*Primary Examiner* — David R Vincent
(74) *Attorney, Agent, or Firm* — Schwegman Lundberg & Woessner, P.A.

(57) ABSTRACT

A system and method for identifying an unknown person based on a static posture of the unknown person is described. The method includes receiving data of N skeleton joints of the unknown person from a skeleton recording device. The method further includes identifying the static posture of the unknown person. The method includes dividing a skeleton structure of the unknown person in a plurality of body parts based on joint types of the skeleton structure. In addition, the method includes extracting feature vectors for each of the joint type from each of the plurality of body parts. The method further includes identifying the unknown person based on comparison of the feature vectors for the unknown person with one of a constrained feature dataset and an unconstrained feature dataset for a plurality of known persons.

16 Claims, 2 Drawing Sheets

(51) Int. Cl.
  *G06K 9/00* (2006.01)
  *G01J 5/00* (2006.01)
  *G06N 99/00* (2010.01)
  *G06F 21/32* (2013.01)
(52) U.S. Cl.
  CPC ....... *G06K 9/00369* (2013.01); *G06N 99/005* (2013.01); *G06K 2209/055* (2013.01)
(58) Field of Classification Search
  USPC .................................................... 706/15, 45
  See application file for complete search history.

(56) References Cited

U.S. PATENT DOCUMENTS

| | | | |
|---|---|---|---|
| 2009/0296994 A1* | 12/2009 | Zhang | ............... A61B 5/117 382/115 |
| 2013/0278501 A1 | 10/2013 | Bulzacki | |

OTHER PUBLICATIONS

"Unsupervised clustering of people from 'skeleton' data", Adrian Ball, David Rye, Fabio Ramos, Mari Velonaki, HRI'12 Proceedings of the seventh annual ACM/IEEE International conference on Human-Robot Interaction, Boston, Massachusetts, Mar. 5-8, 2012, pp. 225-226.*

Sinha, Aniruddha, et al., "Person Identification using Skeleton Information from Kinect", The Sixth International Conference on Advances in Computer-Human Interactions, ACHI 2013; Feb. 24 to Mar. 1, 2013; 101-108; Nice, France, (Feb. 24, 2013), 101-108.

Sinha, Aniruddha, et al., "Pose Based Person Identification Using Kinect", IEEE International Conference on Systems, Man, and Cybernetics (SMC) 2013; Oct. 13-16, 2013; 497-503; 978-1-4799-0652-9/13; IEEE; Manchester, (Oct. 13, 2013), 497-503.

* cited by examiner

STATIC POSTURE BASED PERSON IDENTIFICATION

CLAIM OF PRIORITY

This application claims the benefit of priority of India Patent Application Serial No. 31/MUM/2014, filed on Jan. 3, 2014, and the benefit of priority of India Patent Application Serial No. 2551/DEL/2014, filed on Sep. 5, 2014, the benefit of priority of which are claimed hereby, and which are incorporated by reference herein in their entirety.

TECHNICAL FIELD

The present subject matter relates, in general, to person identification and, in particular, to a system and a method for identification of an unknown person based on his static posture.

BACKGROUND

Various systems have been developed in the past few years to identify people based on skeleton data. For example, persons may be identified based on their skeleton data. The skeleton data of a person includes information of skeleton joints of the person while in motion or in specific static poses. The skeleton data of a person includes information of skeleton joints of the person. Unlike other biometrics, such as iris, fingerprint, and facial expression, skeleton data of a person can be captured at a distance and is hard to hide or to imitate which makes the identification of the person unobtrusive. Further, the identification of a person based on the skeleton data does not require cooperation and attention of the person. These aspects help in surveillance scenarios where the person's cooperation is not expected and the person's awareness is not desired at all.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the figures to reference like features and components. Some embodiments of systems and/or methods in accordance with embodiments of the present subject matter are now described, by way of example only, and with reference to the accompanying figures, in which.

DETAILED DESCRIPTION

Figure 1:
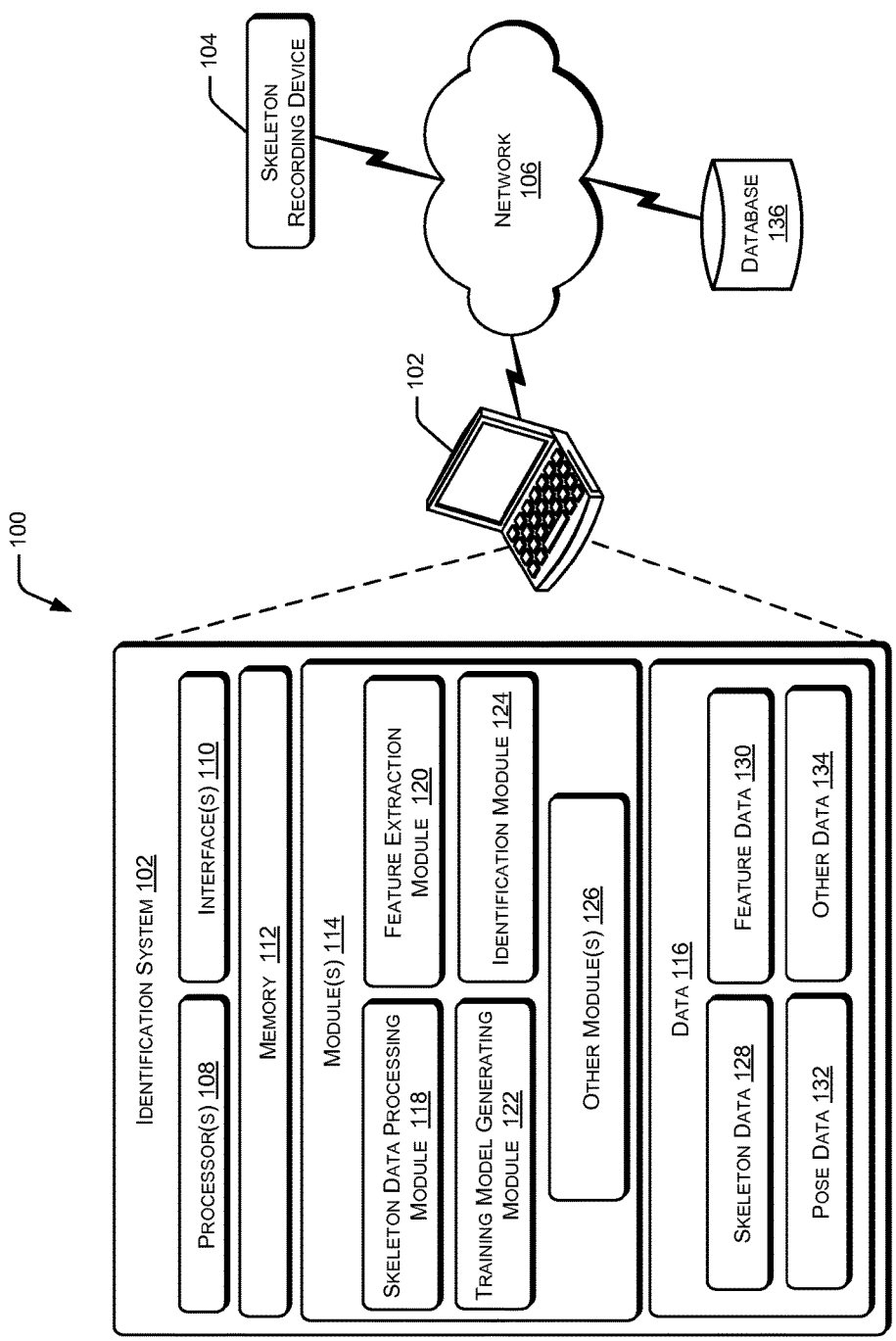
FIG. 1 illustrates a network environment implementing a person identification system, according to an embodiment of the present subject matter.

Various systems for identifying people based on their biometric features, such as fingerprints, iris, face, voice, and handwriting, have been developed in the past few years. Some of the systems may include behavioral characteristics, such as lip movement and typing pattern. However, a person to be identified has to be in physical contact with these systems or near to the systems. If the person is not in a close proximity of the system, then it may be difficult for the system to obtain features, such as the face or the iris of the person for identification of the person. Moreover, the person's co-operation and awareness is needed for identification of the person.

Over the years, non-intrusive systems for identifying persons have been developed. Other systems for identifying people based on their behavioral characteristics, such as walking style, have been developed in recent years. Such systems identify a person using a skeleton recording device having an Infra-red (IR) camera. In conventional systems for identifying people, the skeleton recording device captures a skeleton model of the person while the person is performing a walking activity in front of the skeleton recording device. Thereafter, a feature set that uniquely identifies the person based on his walking activity is determined from the skeleton model. The person can then be identified based on the feature set. However, such systems have been unsuccessful in identifying the person with substantial accuracy, as the feature set based on which the person is to be identified is dynamic in nature. Further, the feature set that uniquely identifies the person based on his walking activity is large in size, which consumes a substantially large memory space. Furthermore, the processing load and the processing time for the identification of the person based on such a feature set are substantially large.

In accordance with the present subject matter, a system and a method for identification of an unknown person, from amongst a plurality of known persons, based on his static posture are described. In one example, the static posture may be understood as a posture that is held for several seconds. In another example, the static posture may be understood as a posture with minimum body movements.

In an example, the static posture may be one of many possible static postures, such as a sitting posture, a standing posture, a lying posture, a bending posture, and a leaning posture. For the purpose of identification of an unknown person, the system of the present subject matter is trained initially over a plurality of known persons. Then the unknown person, from amongst the plurality of known persons, can be identified through the system. The unknown person may be identified based on the training of the identification system. If features pertaining to the unknown person are not present in identification system, the identification system may classify the unknown person to nearest match that may be available based on the similarity of the features. In an implementation, the identification system may be re-trained if number of occurrences of such mismatch are more. In an implementation, identification of an unknown person is performed in real-time; however, the training of the system may or may not be performed in real-time.

In an implementation, for training the system, data of N skeleton joints of each of the known persons is received for at least one predefined static posture at different positions and predefined poses in each of the position. The predefined static posture may include one of the sitting posture, the standing posture, the bending posture, the leaning posture, and the lying posture. Further, the posture may have multiple poses. A pose may be understood as orientation or variation of human body parts or whole human body with respect to some reference point while being in the static posture. For the purposes of the present subject matter, a skeleton recording device, such as a Kinect®, may be considered as the reference point for determining the pose of the person in the static posture. In one example, the data of N skeleton joints of each of the known persons is received from a skeleton recording device. The skeleton recording device may be a Kinect® device or a RGB-D sensor that can record skeleton joints of any person. The static posture of the unknown person is identified by dividing a skeleton structure of the unknown person in a plurality of body parts based on joint types of the skeleton structure. In an example, the data of 20 skeleton joints (N=20), including a head joint, a shoulder centre joint, a shoulder left joint, a shoulder right joint, a spine joint, a hand left joint, a hand right joint, an elbow right joint, an elbow left joint, a wrist right joint, a wrist left joint, a hip left joint, a hip right joint, a hip centre joint, a knee right 5 joint, a knee left joint, a foot left joint, a foot right joint, an ankle right joint, and an ankle left joint are received for each known person.

For each predefined static posture at different positions and predefined poses in each of the position, the data associated with the N skeleton joints for each known person is processed separately to extract a set of features. The set of feature is feature vectors for each of the joint types from each of the plurality of body parts, which is characteristic of a respective known person and a respective static posture. The joint types comprise static joints, dynamic joints, and noisy joints. The feature vector for each known person is referred to as a training static posture feature set, based on which the system is trained so as to identify an unknown person, from the known persons, based on his static posture.

In one implementation, to extract the training static posture feature vector for a known person in a predefined static posture, joint coordinates of the N skeleton joints for the predefined static posture of that known person are determined. In an example, Cartesian joint coordinates and spherical joint coordinates of each of the N skeleton joints are determined from the data of the N skeleton joints. The training static posture feature set for the predefined static posture of the known person is extracted based on the joint coordinates of the N skeleton joints. The training static posture feature vector for each of the known persons is extracted in a similar manner.

In one example, for the known person in the sitting posture, a training sitting feature vector is extracted for the known person. The training sitting feature vector includes a first set of static features having a first set of angle related static features, area related static features, and distance related static features. The first set of angle related static features, the area static related features, and the distance static related features include static features that are unique for the sitting posture of the known person. the first vector of static features comprises angle between a shoulder left joint, a shoulder centre joint, and a spine joint, angle between a shoulder right joint, the shoulder centre joint, and a spine joint, angle between the shoulder centre joint and the spine with respect to a vertical axis, area occupied by a polygon formed by the shoulder left joint, the shoulder centre joint, and the shoulder right joint, and a distance between two joints in each of a Cartesian co-ordinate system and a spherical co-ordinate system.

In another example, for the known person in the standing posture, a training standing feature vector is extracted for the known person. The training standing feature vector includes a second set of static features having a second set of angle related static features, area related static features, and distance related static features. The second set of angle related static features, the area related static features, and the distance related static features include static features that are unique for the standing posture of the known person. The second set of static features comprises an angle between a shoulder left joint, a shoulder centre joint, and a spine joint, an angle between a shoulder right joint, the shoulder centre joint, and the spine joint, an angle between the shoulder centre joint and the spine with respect to a vertical axis, an angle between a hip left joint, a hip centre joint, and a hip right joint, an area occupied by a polygon formed by the shoulder left joint, the shoulder centre joint, and the shoulder right joint, an area occupied by a polygon formed by the hip left joint, the hip centre joint, and the hip right joint, and a distance between two joints in each of a Cartesian co-ordinate system and a spherical co-ordinate system.

Once the training static posture feature vectors are extracted for a plurality of known persons, the training static feature vectors are populated in a training dataset and the system is trained for the training dataset using a classifier. In one example, the classifier may be a Support Vector Machine (SVM) classifier with Radial Basis Function (RBF) as kernel using which a training model is generated for the training static posture feature sets. The SVM classifier is a supervised learning classifier having learning algorithms which are used for classification of data. In one example, for the predefined static posture being the sitting posture, a training model is generated based on the training sitting feature vectors for training the system and for the predefined static posture being the standing posture, a training model is generated based on the training standing feature vector for training the system. The training model based on the training sitting feature vectors may be referred to as a sitting training model and the training model based on the training standing feature vectors may be referred to as a standing training model.

In an implementation, for identification of an unknown person in real-time, data of N skeleton joints of the unknown person is received from the skeleton recording device. The unknown person to be identified may be from amongst the known persons for which the system is trained. Thereafter, Cartesian joint coordinates and spherical joint coordinates of each of the N skeleton joints are determined from the data of the N skeleton joints of the unknown person.

Once the joint coordinates of the N skeleton joints are determined, a static posture of the unknown person is identified by dividing the skeleton structure of the unknown person in the plurality of body parts based on joint types of the skeleton structure. Further, feature vectors are extracted for each of the joint types from each of the plurality of body parts, corresponding to the static posture of the unknown person for identification of the unknown person, wherein the feature vectors are extracted based on the data of the N skeleton joints of the unknown person. The joint types comprise static joints, dynamic joints, and noisy joints. In one example, the static posture of the unknown person is identified as a predefined static posture based on range and mean of joint coordinates of predefined skeleton joints, from amongst the N skeleton joints, of the unknown person. The predefined skeleton joints may include the head joint, the shoulder center joint, the shoulder left joint, and the shoulder right joint, and the joint coordinates may include Cartesian coordinates of the predefined skeleton joints. In an example, the predefined static posture is one of the sitting posture, the standing posture, the lying posture, the bending posture, and the leaning posture.

Thereafter, a static posture feature vector corresponding to the static posture of the unknown person is extracted, wherein the feature vectors are extracted for each of the joint types from each of the plurality of body parts. The static posture feature vector for the unknown person may be extracted based on the data of the N skeleton joints of the unknown person. According to an example, if it is identified that the unknown person is in the sitting posture, then a sitting feature vector for the unknown person is extracted.

The sitting feature vector for the unknown person comprises a first set of static vector. In one example, the first set of static features includes angle related static features, area related static features, and distance related static features. Further, if it is identified that the unknown person is in the standing posture, then a standing feature vector for the unknown person is extracted. The standing feature vector for the unknown person comprises a second set of static features. In an example, the second set of static features includes angle related static features, area related static features, and distance related static features.

Finally, the unknown person is identified based on comparison of the feature vectors for the unknown person with one of a constrained feature dataset and an unconstrained feature dataset for a plurality of known persons, wherein the constrained and the unconstrained feature datasets comprise at least one feature set for each of the plurality of known persons. The unknown person is identified based on comparison of the static posture feature vector for the unknown person with the training static posture feature vectors for the plurality of known persons and corresponding to the static posture. In one example, if the unknown person is in the sitting posture, then the sitting feature vector for the unknown person is compared with the sitting training model. In other example, if the unknown person is in the standing posture, then the standing feature vector for the unknown person is compared with the standing training model. In one example, comparison of the standing feature set for the unknown person and the standing training model is done using a supervised learning based classification technique. According to the technique, the SVM classifier with RBF kernel may map the standing feature set for the unknown person in the standing training model of known persons.

According to the present subject matter, since the unknown person is identified based on the skeleton joints of the unknown person received from the skeleton recording device, the identification of the unknown person is unobtrusive and cooperation and awareness of the unknown person is not required. Further, since only one type of static posture feature vector corresponding to the static posture that is unique for person identification in the same static posture is extracted for the unknown person and compared with the training static posture feature vectors for the known persons and corresponding to the same static posture, the processing load and the processing time for the identification of the unknown person, from amongst the known persons, are substantially reduced. Further, with the training dataset having the training static posture feature vectors corresponding to predefined static postures according to the present subject matter, the size of training dataset is substantially small. With this the memory space consumed by the training dataset is substantially reduced.

The following disclosure describes system and method for identification of an unknown person based on a static posture of the unknown person. While aspects of the described system and method can be implemented in any number of different computing systems, environments, and/or configurations, embodiments for identification of an unknown person based on a static posture of the unknown person are described in the context of the following exemplary systems and methods.

FIG. 1 illustrates a network environment 100 implementing an identification system 102, in accordance with an embodiment of the present subject matter. In said embodiment, the identification system 102 is for identification of an unknown person. In an example, the person may be from amongst a plurality of known persons. The unknown person may be identified based on a pose in a static posture at any position. The static posture may be understood as a posture that is held for several seconds or a posture with minimum body movements. In an example, the static posture may be one of the sitting posture, the standing posture, the lying posture, the bending posture, and the leaning posture. Further, the pose may be understood as orientation or variation of human body parts or whole human body in the posture with respect to some reference point. In addition, the position may be understood as a spatial location of the person within the field of view (FOV) of a skeleton recording device 104.

In one implementation, the network environment 100 can be a public network environment, including thousands of individual computers, laptops, various servers, such as blade servers, and other computing devices. In another implementation, the network environment 100 can be a private network environment with a limited number of computing devices, such as individual computers, servers, and laptops.

The identification system 102 may be implemented in a variety of computing systems, such as a laptop computer, a desktop computer, a notebook, a smart phone, a tablet, a workstation, a mainframe computer, a server, a network server, and the like. In one implementation, the identification system 102 is communicatively coupled with the skeleton recording device 104 through a network 106.

In one implementation, the network 106 may be a wireless network, a wired network, or a combination thereof. The network 106 may also be an individual network or a collection of many such individual networks, interconnected with each other and functioning as a single large network, e.g., the Internet or an intranet. The network 106 may be implemented as one of the different types of networks, such as intranet, local area network (LAN), wide area network (WAN), the internet, and the like. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 106 may include a variety of network devices, including routers, bridges, servers, computing devices, storage devices, and the like.

According to an implementation, the identification system 102 includes processor(s) 108, interface(s) 110, and a memory 112 coupled to the processor(s) 108. The processor(s) 108 may be implemented as one or more microprocessors, microcomputers, microcontrollers, digital signal processors, central processing units, state machines, logic circuitries, and/or any devices that manipulate signals based on operational instructions. Among other capabilities, the processor(s) 108 may be configured to fetch and execute computer-readable instructions stored in the memory 112.

The memory 112 may include any computer-readable medium known in the art including, for example, volatile memory, such as static random access memory (SRAM) and dynamic random access memory (DRAM) and/or nonvolatile memory, such as read only memory (ROM), erasable programmable ROM, flash memories, hard disks, optical disks, and magnetic tapes.

Further, the interface(s) 110 may include a variety of software and hardware interfaces, for example, interfaces for peripheral device(s), such as a product board, a mouse, an external memory, and a printer. Additionally, the interface(s) 110 may enable the identification system 102 to communicate with other devices, such as web servers and external repositories. The interface(s) 110 may also facilitate multiple communications within a wide variety of networks and protocol types, including wired networks, for example, LAN, cable, etc., and wireless networks, such as WLAN, cellular, or satellite. For the purpose, the interface(s) 110 may include one or more ports.

The identification system 102 also includes module(s) 114 and data 116. The module(s) 114 include, for example, a skeleton data processing module 118, a feature extraction module 120, a training model generating module 122, an identification module 124, and other module(s) 126. The other module(s) 126 may include programs or coded instructions that supplement applications or functions performed by the identification system 102. The data 116 may include skeleton data 128, feature data 130, pose data 132, and other data 134. In one example, the skeleton data 128 may include data relating to skeleton joints of an unknown person, the feature data 130 may include data related to feature vectors of the unknown person, and the pose data 132 may include data relating to a pose of the unknown person. Further, the other data 134, amongst other things, may serve as a repository for storing data that is processed, received, or generated as a result of the execution of one or more modules in the module(s) 114.

Further, the network environment 100 may include a training database 136 for training the identification system 102. The training database 136 may include a training dataset comprising features vectors pertaining to a plurality of known persons in different poses of the static posture. Although the training database 136 is shown external to the identification system 102, it will be appreciated by a person skilled in the art that the training database 136 can also be implemented internal to the identification system 102. Further, the training database 136 may be accessed whenever an unknown person is to be identified by the identification system 102. Furthermore, the training database 136 may be periodically updated. For example, new data may be added into the training database 136, existing data in the training database 136 may be modified, or non-useful data may be deleted from the training database 136.

In one embodiment of the present subject matter, for the purpose of identification of the unknown person, the identification system 102 is initially trained over the plurality of known persons for one or more pre-defined static postures and poses at different positions within the FOV of the skeleton recording device 104. Thereafter, the unknown person is identified through the identification system 102. The identification system 102 may be pre-trained, i.e., may not be trained in real-time; however, the identification of the unknown person is performed in real-time through the identification system 102.

The description below describes the procedure to train the identification system 102 for a plurality of known persons and for one pre-defined static posture at different positions within the FOV of the skeleton recording device 104. The procedure can be repeated to train the identification system 102 for the plurality of known persons and for multiple pre-defined static postures. In one example, the pre-defined static postures may include the sitting posture, the standing posture, the lying posture, the leaning posture, the bending posture, and the like.

In an implementation, for training the identification system 102 for a predefined static posture at different positions and predefined poses in each of the position, the skeleton data processing module 118 may receive an input from a user, such as an administrator. The input may include a count of known persons and their respective unique identifiers. A unique identifier of a known person uniquely defines and identifies the known person. For example, the unique identifier may be a name of the known person. In an example, the unique identifier may be person A, person B, person C, Person D, and so on.

Thereafter, the skeleton data processing module 118 may receive data pertaining to skeleton joints of each of the known persons from the skeleton recording device 104. In an implementation, the data pertaining to the skeleton joints is obtained when each of the known persons is in the pre-defined static posture at different positions in the FOV of the skeleton recording device 104. In an example, the FOV may be divided into 9 blocks, such that the 9 blocks over the entire FOV of the skeleton recording device 104. Accordingly, the skeleton data processing module 118 may capture intra-person variation of different features for different positions.

Further, based on the position of the known person in each of the 9 blocks, the skeleton data processing module 118 receives 20 skeleton joints for each of the known person in the pre-defined static posture. The 20 skeleton joints may include a head joint, a shoulder centre joint, a shoulder left joint, a shoulder right joint, a spine joint, a hand left joint, a hand right joint, an elbow right joint, an elbow left joint, a wrist right joint, a wrist left joint, a hip left joint, a hip right joint, a hip centre joint, a knee right joint, a knee left joint, a foot left joint, a foot right joint, an ankle right joint, and an ankle left joint.

In one implementation, based on the data pertaining to the skeleton joints, the skeleton data processing module 118 may determine joint coordinates of each of the skeleton joints of that known person. In an example, the skeleton data processing module 118 determines x, y, and z Cartesian joint coordinates of each of the skeleton joints from the data pertaining to the skeleton joints. In an example, 'x' represents variation in a left or a right direction, 'y' represents up and down variation, and 'z' represents to and from variation of subject with respect to the skeleton recording device 104. For instance, if the skeleton data processing module 118 receives data of 20 skeleton joints, then the skeleton data processing module 118 determines 60 Cartesian joint coordinates (20*3=60).

In addition, the skeleton data processing module 118 may determine angles formed by some joints with respect to the skeleton recording device 104. In an example, whether the person is in a bending or leaning posture may be determined based on an angle made by spine, hip center, and the skeleton recording device 104. In another example, the standing or the sitting posture may be identified based on the angle made by the knee joints and hip joints with the skeleton recording device 104. Accordingly, based on the angles formed by certain joints of the skeleton structure with respect to the skeleton recording device 104 in X-Y or Y-Z plane may facilitate in differentiating the posture of the person.

In an implementation, based on the joint coordinates, the skeleton data processing module 118 may identify the static posture of the known person. In an example, the static posture may be identified as a pre-defined static posture based on range and mean of joint coordinates of the pre-defined skeleton joints, from amongst the skeleton joints, of the known person. In the present example, range may be understood as upper and lower value of a particular variable. For instance, if 'x' co-ordinate of Knee varies from 1.2 m to 1.31 m; then in this case, range is equal to 1.31-1.2 m. Further, mean is average value of the joint co-ordinates.

Once the skeleton data processing module 118 determines the static posture of the known persons, the feature extraction module 120 may divide entire skeleton structure of the known persons in different parts based on a plurality of joint types. In an implementation, the skeleton structure may be divided into four parts, namely, static joints, dynamic upper joints, dynamic lower joints, and noisy joints. The static joints may be understood as those joints in the skeleton structure that are fixed for any pose in a particular static posture. Examples of the static joints may include spine, hip center, and the like. Further, in a single pose, there may exist certain joints that may be moved by the person. Such joints may be referred to as the dynamic joints. The dynamic joints are further divided into two parts as dynamic upper and dynamic lower. Examples of the dynamic joints may include Knee left, Wrist left, Foot left, and the like. In addition, there exists certain joints that are prone to noise due to occlusion effect. For example, in a sitting posture, hip left and hip right are occluded with knee left and knee right respectively. These types of joints may be referred to as the noisy joints.

In an implementation, the feature extraction module 120 may divide the skeleton structure of the known persons in four parts by employing density based clustering techniques. In an example, the feature extraction module 120 may employ a Density Based Spatial Clustering of Applications with Noise (DBSCAN). DBSCAN relies on density-based clustering to identify clusters of arbitrary shape. In another example, the feature extraction module 120 may employ a K-means clustering technique to for creating three clusters based on the joint types.

In an implementation, for each of the four parts, the feature extraction module 120 may extract feature vectors $F_{cu}$, $F_c$, $F_y$ from the joint coordinates. In an implementation, the feature vector $F_{cu}$ represents various unique combinations of the 20 skeleton joints whether physically connected or not. Further, the feature vector Fc represents various physically connected pairs of skeleton joints, and the feature vector $F_y$ represents difference of 'y' co-ordinate between every physically connected pair of the skeleton joints. The feature vectors may be derived from the joint coordinates as mentioned below:

$$F_{cu} = |((x^j, y^j, z^j) - (x^k, y^k, z^k))| \forall j=[1,20], k=[1,20], j \neq k$$

$$F_{cu} \in R^{D \times C2}, \text{ where } D=3 \text{ and } J=20. \quad (1)$$

where J the total number of joints and D is the number of coordinates.

$$F_c = |((x^j, y^j, z^j) - (x^k, y^k, z^k))| \forall j, k = \{1, \ldots, 20 | j, k \text{ connected}\}$$

$$F_c \in R^{D \times CP}, \text{ and } F_c C F_{cu}, \text{ where } D=3 \text{ and } CP=19. \quad (2)$$

where CP represents number of physically connected joint-pairs.

$$F_y = |((y^j) - (y^k))| \forall j, k = \{1, \ldots, 20 | j, k \text{ connected}\}$$

$$F_y \in R^{CP}, \text{ and } F_y C F_{cu}, \text{ where } CP=19. \quad (3)$$

Further, the feature extraction module 120 may determine angular features, such as the angles formed by shoulder joints of the human skeleton. The angular features along with the feature vectors may be indicative of the pose of the person in the static posture. The feature extraction module 120 may further compute various combinations of the feature vectors $F_{cu}$, $F_c$, $F_y$ for the different parts of the skeleton structure. The different combinations of the feature vectors may act as a training dataset for the identification system 102. Accordingly, total number of combinations may be computed as:

$$\sum_{k=1}^{TP} p^k \times \binom{TP}{k}$$

where T P represents the total number of body parts and p represents total number of features.

In an example, for different body parts and three feature vectors, the different combinations may be 255. Based on these combinations of the feature vectors, the training model generating module 122 may assess the training dataset to evaluate its performance for identification of the unknown persons. In an implementation, to do so, the training model generating module 122 may divide the entire training dataset into two sets, for each of the constrained poses and the unconstrained poses. The constrained poses may be understood as limited or pre-defined poses when the person is in the static posture. On the other hand, the unconstrained poses may be understood as natural poses in the static posture. In the present example, a first set of feature vectors may be used for training the identification system 102 and a second set of feature vectors may be used for validating accuracy of the identification system 102. Accordingly, for each of the constrained poses and the unconstrained poses, the training model generating module 122 may create two sets of the feature vectors for training and testing the identification system 102.

In an implementation, in order to evaluate the performance of the identification system 102 for based on the different feature vectors and body part combination for the constrained and the unconstrained poses, the training model generating module 122 may compute identification accuracy in terms of F-score for each of the combinations. The F-score may be understood as harmonic mean of precision and recall. In an example, for N persons, the F-score may be defined as:

$$F - score_i = \frac{2 * precision_i * recall_i}{(precision_i * recall_i)} \forall i,$$

$$1 \leq i \leq N$$

Further, based on the performance of the identification system 102 for identification of the unknown person, the training model generating module 122 may select an optimal set of feature vectors for the constrained poses as well as the unconstrained poses and obtain the optimal feature vector for the plurality of body parts for each posture and for all positions and poses. In an example, the optimal set of feature vectors for the constrained poses may be referred to as the constrained feature dataset and the optimal set of feature vectors for the unconstrained poses may be referred to as the unconstrained feature dataset.

In an implementation, the constrained and the unconstrained feature datasets may include a plurality of feature sets corresponding to various static postures with the constrained and the unconstrained poses respectively. For example, the constrained feature dataset may include a standing feature set, a sitting feature set, a lying feature set, a leaning feature set, a bending feature set, and the like. Each of these feature sets may include feature vectors pertaining to various constrained poses that may be taken by each of the known persons for corresponding static postures. Similarly, the unconstrained feature dataset may include a plurality of feature sets corresponding to various static postures with the unconstrained poses that may be taken by each of the plurality of known persons.

Once the constrained and the unconstrained feature datasets are extracted for the plurality of known persons, the training model generating module 122 may populate these datasets in the training database 136. The identification system 102 is then trained for the training database 136 using a classifier. In one example, the classifier may be a Support Vector Machine (SVM) classifier with Radial Basis Function (RBF) as kernel using which at least one training model is generated for the constrained and the unconstrained feature datasets. The SVM classifier is a supervised learning classifier having learning algorithms which are used for classification of data.

In one example, for the static postures with constrained poses, the training model generating module 122 may generate training model based on the feature vectors of the constrained feature dataset for training the identification system 102. Likewise, for the static postures with unconstrained poses, training model generating module 122 may generate training model based on the feature vectors of the unconstrained feature dataset for training the identification system 102. The training model based on the constrained poses may be referred to as a constrained training models and the training model based on the unconstrained poses may be referred to as unconstrained training models. In the present example, the constrained and the unconstrained training models are generated to train the identification system for the different positions of the known person within the FOV of the skeleton recording device.

Further, the constrained and the unconstrained training models may include separate training models independent of the position of a person within the FOV of the skeleton recording device 104 for different static postures, such as the sitting posture, the standing posture, the lying posture, the bending posture, and the leaning posture. In an implementation, the constrained training model in each posture may be generated by using frontal pose data at multiple positions of the plurality of known persons. On the other hand, the unconstrained training model may be generated from different poses collected from multiple positions.

The procedure described above can be repeated for training the identification system 102 for the plurality of known persons and for multiple pre-defined static postures in different poses and at different positions.

Although it has been described the identification system 102 computes the feature datasets for all the known persons for all static postures; however, in an implementation, the feature datasets may be computed by an external computing device and stored in an external memory, such as the training database 136. The identification system 102 may obtain the training feature datasets from the external memory whenever an unknown person is to be identified. The manner in which the identification system 102 identifies the unknown person is described henceforth.

In an implementation, for identification of an unknown person in real-time, the skeleton data processing module 118 may receive data of skeleton joints of the unknown person from the skeleton recording device 104. In an example, the unknown person may be identified based on the known persons for which the identification system 102 was trained.

Thereafter, the skeleton data processing module 118 obtains the joint coordinates of each of the skeleton joints of the unknown person. In an example, the skeleton data processing module 118 obtains x, y, and z Cartesian joint coordinates of each of the skeleton joints. Once the skeleton data processing module 118 obtains the joint coordinates of the skeleton joints, the skeleton data processing module 118 may determine the static posture of the unknown person. In an example, the skeleton data processing module 118 may determine the static posture of the unknown person based on range and mean of joint coordinates of pre-defined skeleton joints, from amongst the skeleton joints, of the unknown person. In an example, the static posture may be from amongst the known static postures for which the identification system 102 was trained. The static posture may be one of the sitting posture, the standing posture, the lying posture, the bending posture, and the leaning posture, the leaning posture, and the standing posture. Further, the unknown person may be at any position in the FOV of the skeleton recording device 104. Furthermore, the pre-defined skeleton joints may include the head joint, the shoulder centre joint, the shoulder left joint, and the shoulder right joint. The skeleton data processing module 118 may store the joint coordinates of the unknown person as the skeleton data 128.

Further, the feature extraction module 120 may divide the skeleton structure of the unknown person into four parts based on the joint types. For each of the four parts, the feature extraction module 120 may extract the feature vectors $F_{cu}$, $F_c$, $F_y$ for all the four parts. In addition to the feature vectors, the feature extraction module 120 may determine angular features, such as the angles formed by the shoulder joints of the unknown person. The feature extraction module 120 may store the feature vectors and the angular features of the unknown person as the feature data 130. Based on the feature vectors, the feature extraction module 120 may determine whether the pose of the unknown person is a constrained pose or an unconstrained pose. For example, the feature extraction module 120 may determine orientation of the unknown person with respect to the skeleton recording device 104 in the Z-X plane. The feature extraction module 120 may store the orientation of the unknown person as the pose data 132.

Upon determining the pose of the unknown person, the identification module 124 may extract a feature set from the training database 136 corresponding to the pose of the unknown person. According to one implementation, if it is identified that the unknown person is in the constrained pose, then the identification module 124 extracts the constrained feature dataset for the unknown person from the training database 136. The constrained feature dataset for the unknown person includes different feature sets for multiple predefined static postures. Further, each of the static feature set includes a first set of angle related static features, area related static features, and distance related features that are unique for the constrained pose for identification of the unknown person.

In another implementation, if it is identified that the unknown person is in the unconstrained pose, then the identification module 124 extracts the unconstrained feature dataset for the unknown person. The unconstrained feature dataset for the unknown person includes different feature sets for multiple pre-defined static postures. Further, each of the static feature set includes a second set of angle related static features, area related static features, and distance related features that are unique for the unconstrained pose for identification of the unknown person.

Thereafter, the identification module 124 identifies the unknown person based on comparison of the feature set for the unknown person with either the constrained or the unconstrained feature datasets for the plurality of known persons and corresponding to the same static posture as that of the unknown person. In one example, if the unknown person is in the sitting posture with a constrained pose, then the identification module 124 identifies the unknown person based on comparison of the sitting feature set for the unknown person with the sitting feature set from the constrained feature dataset of the known persons.

As the constrained and the unconstrained feature datasets include the optimal feature vectors from the training dataset, the identification system 102 provides accurate results while identifying the unknown person. In addition, the memory space consumed by the constrained and the unconstrained feature datasets is substantially reduced.

Figure 2:
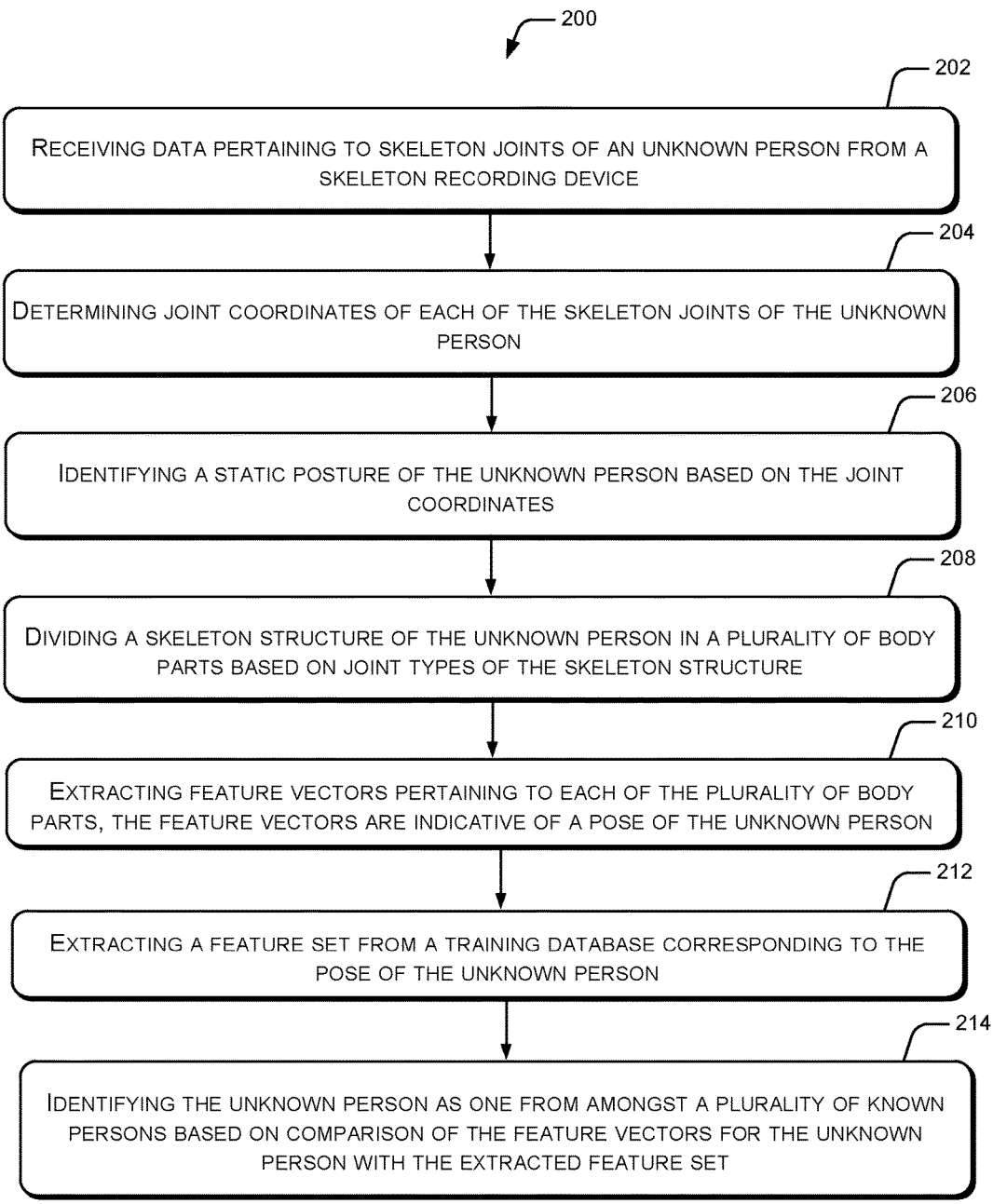
FIG. 2 illustrates a method for identifying an unknown person based on a static posture of the unknown person, according to an embodiment of the present subject matter.

FIG. 2 illustrates a method 200 for identification of an unknown person based on a pose of the unknown person in a static posture, according to an embodiment of the present subject matter. The method 200 is implemented in a computing device, such as the identification system 102. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network.

The order in which the method is described is not intended to be construed as a limitation, and any number of the described method blocks can be combined in any order to implement the method, or an alternative method. Furthermore, the method can be implemented in any suitable hardware, software, firmware or combination thereof.

At block 202, the method 200 includes receiving data pertaining to skeleton joints of the unknown person from a skeleton recording device 104. In accordance with one implementation of the present subject matter, the skeleton data processing module 118 of the person identification system 102 receives the data pertaining to the skeleton joints of an unknown person from the skeleton recording device 104.

At block 204, the method 200 includes determining joint coordinates of each of the skeleton joints of the unknown person. In an example, x, y, and z Cartesian joint coordinates of each of the skeleton joints are determined. In one implementation, the skeleton data processing module 118 determines the joint coordinates of the skeleton joints.

At block 206, the method 200 includes identifying a static posture of the unknown person based on the joint coordinates. In one implementation, the skeleton data processing module 118 identifies the static posture of the unknown person. The static posture may be one of a sitting posture, a standing posture, a lying posture, a bending posture, and a leaning posture. In one example, the static posture of the unknown person is identified as a pre-defined static posture based on range and mean of the joint coordinates of pre-defined skeleton joints, from amongst the skeleton joints, of the unknown person. Examples of the pre-defined skeleton joints include the head joint, the shoulder centre joint, the shoulder left joint, and the shoulder right joint.

At block 208, the method 200 includes dividing a skeleton structure of the unknown person in a plurality of body parts based on joint types, of the skeleton structure. In an implementation, the feature extraction module 120 may divide the skeleton structure of the unknown person in the four parts, namely, static upper body, dynamic upper limbs, dynamic lower limbs, and noisy middle hip. In an example, the feature extraction module 120 may employ a density based clustering technique to divide the skeleton structure in the four parts.

Further, at block 210, the method 200 may include extracting feature vectors pertaining to each of the plurality of body parts of the skeleton structure of the unknown person. In an implementation, the feature extraction module 120 may extract the feature vectors $F_{cu}$, $F_c$, $F_y$ for each of the four parts. In an implementation, the feature vector $F_{cu}$ represents various unique combinations of the 20 skeleton joints whether physically connected or not. Further, the feature vector $F_c$ represents various physically connected pairs of skeleton joints, and the feature vector $F_y$ represents difference of 'y' co-ordinate between every physically connected pair of the skeleton joints. The feature vectors may facilitate in determining the pose of the unknown person in the static posture.

At block 212, the method 200 may include extracting a feature set from a training database 136 corresponding to the pose of the unknown person. In an implementation, the identification module 124 may extract the feature set from the training database 136. In an example, if it is identified that the unknown person is in the constrained pose, then the identification module 124 extracts the constrained feature dataset for the unknown person from the training database 136.

At block 214, the method 200 includes identifying the unknown person based on comparison of the feature vectors for the unknown person with the extracted feature set. In an implementation, the identification module 124 may identify the unknown person by comparing the feature vectors of the unknown person with either the constrained feature dataset or the unconstrained feature dataset.

As described earlier, for the purpose of identification of the unknown person, the identification system 102 is trained initially over the plurality of known persons.

In an implementation, for training the identification system 102, data of skeleton joints of each of the known persons is received from the skeleton recording device 104, while each known person is in a pre-defined static posture at different positions within the FOV of the skeleton recording device 104. For example, the FOV of the skeleton recording device 104 may be divided into 9 blocks that cover the FOV completely. Thereafter, joint coordinates of the skeleton joints for the pre-defined static posture of that known person are determined. The joint coordinates facilitate in determining the posture of the unknown person. Further, the skeleton structure of each of the known persons is divided into four parts and for each of the four parts, feature vectors $F_{cu}$, $F_c$, $F_y$ are extracted. The feature vectors facilitate in determining the pose of the known persons in the static posture.

Further, different combinations of the feature vectors may be computed for each of the four body parts. The different combinations may form a training dataset that may referred for identification of the unknown person. The training dataset is evaluated to assess its performance while identifying an unknown person. Based on the evaluation, an optimal set of feature vectors is selected for identification of the unknown person. These optimal set of feature vectors for constrained poses may be referred to as the constrained feature dataset and for the unconstrained poses may be referred to as the unconstrained feature dataset. The optimal feature vector is obtained the plurality of body parts for each posture and for all positions and poses. The constrained and the unconstrained feature datasets are populated in the training database 136 and the identification system 102 is trained for these datasets using a classifier. In one example, the classifier may be a Support Vector Machine (SVM) classifier.

Although embodiments for methods and systems for identification of an unknown person based on pose of the unknown person in a static posture have been described in a language specific to structural features and/or methods, it is to be understood that the invention is not necessarily limited to the specific features or methods described. Rather, the specific features and methods are disclosed as exemplary embodiments for identification of an unknown person based on a pose of the unknown person in a static posture.

What is claimed is:

1. A method for identifying an unknown person based on a static posture of the unknown person, the method comprising:
   receiving data of N skeleton joints of the unknown person, wherein the data of the N skeleton joints is received from a skeleton recording device;
   identifying, by a processor, the static posture of the unknown person by dividing a skeleton structure of the unknown person in a plurality of body parts based on joint types of the skeleton structure;
   extracting, by the processor, feature vectors for each of the joint types from each of the plurality of body parts, based on the static posture of the unknown person for identification of the unknown person, wherein the feature vectors represent various unique combinations of the N skeleton joints, various physically connected pairs of skeleton joints, and difference of Y co-ordinate between each physically connected pair of the skeleton joints;
   determining a pose in the static posture of the unknown person based on the extracted feature vectors;
   generating, by the processor, a training model based on training feature vectors of a plurality of known persons and assessing the training model based on testing feature vectors of the plurality of known persons to evaluate performance of the training model while identifying the unknown person, wherein the performance is evaluated based on a harmonic mean of precision and recall;
   selecting, by the processor, an optimal set of feature vectors for each of constrained poses and unconstrained poses of the plurality of known persons based on the performance of the training model, wherein the constrained poses are at least one of a limited pose and a pre-defined pose and the unconstrained pose is a natural pose;
   identifying, by the processor, the unknown person, based on comparison of the feature vectors for the unknown person with the optimal set of feature vectors of the plurality of known persons corresponding to the determined pose in the static posture, wherein the unknown person is identified as one of the plurality of known persons based on similarity of the feature vectors for the unknown person and the optimal set of feature vectors of the plurality of known persons; and
   retraining the training model for identification of the unknown person when the feature vectors of the unknown person are not similar to the optimal set of feature vectors of the plurality of known persons corresponding to the determined pose in the static posture.

2. The method as claimed in claim 1, wherein the N skeleton joints of the unknown person comprises a head joint, a shoulder centre joint, a shoulder left joint, a shoulder right joint, a spine joint, a hand left joint, a hand right joint, an elbow right joint, an elbow left joint, a wrist right joint, a wrist left joint, a hip left joint, a hip right joint, a hip centre joint, a knee right joint, a knee left joint, a foot left joint, a foot right joint, an ankle right joint, and an ankle left joint.

3. The method as claimed in claim 1 further comprising:
   determining joint coordinates of the N skeleton joints of the unknown person, wherein the joint coordinates comprise Cartesian joint coordinates and spherical joint coordinates of each of the N skeleton joints, and
   wherein the static posture feature vectors is extracted based on the joint coordinates.

4. The method as claimed in claim 1, wherein the static posture of the unknown person is identified as a predefined static posture based on joint coordinates of predefined skeleton joints, from amongst the N skeleton joints, of the unknown person and the predefined static posture is one of a sitting posture, a standing posture, a lying posture, a bending posture, and a leaning posture and the joint types comprise static joints, dynamic joints, and noisy joints.

5. The method as claimed in claim 1, wherein, when the unknown person is identified to be in a sitting posture, the static posture feature vector for the unknown person is a sitting feature vector, and the training static posture feature vectors are training sitting feature vectors of the plurality of known persons, wherein the sitting feature vector comprises a first vector of static features, and wherein the first vector of static features comprises angle between a shoulder left joint, a shoulder centre joint, and a spine joint, angle between a shoulder right joint, the shoulder centre joint, and a spine joint, angle between the shoulder centre joint and the spine with respect to a vertical axis, area occupied by a polygon formed by the shoulder left joint, the shoulder centre joint, and the shoulder right joint, and a distance between two joints in each of a Cartesian co-ordinate system and a spherical co-ordinate system.

6. The method as claimed in claim 1, wherein, when the unknown person is identified to be in a standing posture, the static posture feature vector for the unknown person is a standing feature vector, and the training static posture feature vectors are training standing feature vectors of the plurality of known persons, wherein the standing feature vector comprises a second vector of static features, and wherein the second vector of static features comprises an angle between a shoulder left joint, a shoulder centre joint, and a spine joint, an angle between a shoulder right joint, the shoulder centre joint, and the spine joint, an angle between the shoulder centre joint and the spine with respect to a vertical axis, an angle between a hip left joint, a hip centre joint, and a hip right joint, an area occupied by a polygon formed by the shoulder left joint, the shoulder centre joint, and the shoulder right joint, an area occupied by a polygon formed by the hip left joint, the hip centre joint, and the hip right joint, and a distance between two joints in each of a Cartesian co-ordinate system and a spherical co-ordinate system.

7. The method as claimed in claim 1, wherein identifying the unknown person comprises evaluating person identification accuracy.

8. The method as claimed in claim 1, wherein the method further comprising:
   receiving data of N skeleton joints of each of the plurality of known persons for a predefined static posture at different positions and predefined poses in each of the position within a field of view (FOV) of the skeleton recording device, wherein the data of the N skeleton joints is received from the skeleton recording device;

determining, by the processor, joint coordinates of each of the skeleton joints of each of the plurality of known persons, wherein a static posture of each of the plurality of known persons is determined based on the joint coordinates;

dividing, by the processor, a skeleton structure of each of the plurality of known persons in a plurality of body parts based on joint types of the skeleton structure;

extracting, by the processor, feature vectors for each of the plurality of body parts of the known persons, wherein the feature vectors are indicative of a pose of the known person in the static posture;

obtaining the optimal feature vector for the plurality of body parts for each posture and for all positions and poses; and storing, by the processor, the optimal feature vectors in a training database to identify the unknown person.

9. The method as claimed in claim 8, wherein a person identification system is trained using a classifier, wherein the classifier is a Support Vector Machine (SVM) with Radial Basis Function as kernel.

10. The method as claimed in claim 8, further comprising dividing the FOV of the skeleton recording device in a plurality of blocks to determine a position of the known persons.

11. A person identification system for identifying an unknown person based on a static posture of the unknown person, the person identification system comprising:

a processor;

a skeleton data processing module coupled to, and executable by, the processor to, receive data of N skeleton joints of the unknown person from a skeleton recording device; and determine joint coordinates of the N skeleton joints of the unknown person;

a feature extraction module, coupled to the processor to, divide a skeleton structure of the unknown person in a plurality of body parts based on joint types, based on the static posture of the unknown person; and extract feature vectors for each of the plurality of body parts, wherein the feature vectors are indicative of the pose of the unknown person in the static posture and wherein the feature vectors represent various unique combinations of the N skeleton joints, various physically connected pairs of skeleton joints, and difference of Y co-ordinate between each physically connected pair of the skeleton joints;

a training model generating module coupled to the processor to, generate a training model based on training feature vectors of a plurality of known persons and assess the training model based on testing feature vectors of the plurality of known persons to evaluate performance of the training model while identifying the unknown person, wherein the performance is evaluated based on a harmonic mean of precision and recall and select an optimal set of feature vectors for each of constrained poses and unconstrained poses of the plurality of known persons based on the performance of the training model, wherein the constrained poses are at least one of a limited pose and a pre-defined pose and the unconstrained pose is a natural pose; and an identification module coupled to the processor to, extract the optimal set of feature vectors from a training database corresponding to the pose of the unknown person; and identify the unknown person, based on comparison of the feature vectors for the unknown person with the extracted optimal set of feature vectors for a plurality of known persons, wherein the unknown person is identified as one of the plurality of known persons based on similarity of the feature vectors for the unknown person and the optimal set of feature vectors of the plurality of known persons, wherein the training model generating module retrain the training model for identification of the unknown person when the feature vectors of the unknown person are not similar to the optimal set of feature vectors of the plurality of known persons corresponding to the determined pose in the static posture.

12. The person identification system as claimed in claim 11, wherein the skeleton data processing module further determines spherical joint coordinates and Cartesian joint coordinates of each of the N skeleton joints of the unknown person.

13. The person identification system as claimed in claim 11, when the unknown person is identified to be in a sitting posture, the static posture feature vector for the unknown person is a sitting feature vector, and the training static posture feature vectors are training sitting feature vectors of the plurality of known persons, wherein the sitting feature vector comprises a first set of static features, and wherein the first set of static features comprises an angle between a shoulder left joint, a shoulder centre joint, and a spine joint, an angle between a shoulder right joint, the shoulder centre joint, and a spine joint, an angle between the shoulder centre joint and the spine with respect to a vertical axis, an area occupied by a polygon formed by the shoulder left joint, the shoulder centre joint, and the shoulder right joint, and a distance between two joints in each of a Cartesian coordinate system and a spherical co-ordinate system.

14. The person identification system as claimed in claim 11, when the unknown person is identified to be in a standing posture, the static posture feature vector for the unknown person is a standing feature vector, and the training static posture feature vectors are training standing feature vectors of the plurality of known persons, wherein the standing feature vector comprises a second set of static features, and wherein the second set of static features comprises an angle between a shoulder left joint, a shoulder centre joint, and a spine joint, an angle between a shoulder right joint, the shoulder centre joint, and the spine joint, an angle between the shoulder centre joint and the spine with respect to a vertical axis, an angle between a hip left joint, a hip centre joint, and a hip right joint, an area occupied by a polygon formed by the shoulder left joint, the shoulder centre joint, and the shoulder right joint, an area occupied by a polygon formed by the hip left joint, the hip centre joint, and the hip right joint, and a distance between two joints in each of a Cartesian co-ordinate system and a spherical co-ordinate system.

15. The person identification system as claimed in claim 11, wherein the skeleton data processing module further comprising:

receives data of N skeleton joints of each of the plurality of known persons for a predefined static posture, wherein the data of N skeleton joints is received from a skeleton recording device, and wherein the predefined static posture is one of a sitting posture, a standing posture, a lying posture, a bending posture, and a leaning posture;

extracts a training static posture feature vector for each of the plurality of known persons based on the data of N skeleton joints of a respective known person; and stores the training static posture feature vector for each of the plurality of known persons to identify the unknown person, from amongst the plurality of known persons.

16. A non-transitory computer-readable medium having embodied thereon a computer program for executing a method comprising:
- receiving data of N skeleton joints of the unknown person, wherein the data of the N skeleton joints is received from a skeleton recording device;
- identifying, by a processor, the static posture of the unknown person by dividing a skeleton structure of the unknown person in a plurality of body parts based on joint types of the skeleton structure;
- extracting, by the processor, feature vectors for each of the joint types from each of the plurality of body parts, based on the static posture of the unknown person for identification of the unknown person, wherein the feature vectors represent various unique combinations of the N skeleton joints, various physically connected pairs of skeleton joints, and difference of Y co-ordinate between each physically connected pair of the skeleton joints;
- determining a pose in the static posture of the unknown person based on the extracted feature vectors;
- generating, by the processor, a training model based on training feature vectors of a plurality of known persons and assessing the training model based on testing feature vectors of the plurality of known persons to evaluate performance of the training model while identifying the unknown person, wherein the performance is evaluated based on a harmonic mean of precision and recall;
- selecting, by the processor, an optimal set of feature vectors for each of constrained poses and unconstrained poses of the plurality of known persons based on the performance of the training model, wherein the constrained poses are at least one of a limited pose and a pre-defined pose and the unconstrained pose is a natural pose;
- identifying, by the processor, the unknown person, based on comparison of the feature vectors for the unknown person with the optimal set of feature vectors of the plurality of known persons corresponding to the determined pose in the static posture, wherein the unknown person is identified as one of the plurality of known persons based on similarity of the feature vectors for the unknown person and the optimal set of feature vectors of the plurality of known persons; and
- retraining the training model for identification of the unknown person when the feature vectors of the unknown person are not similar to the optimal set of feature vectors of the plurality of known persons corresponding to the determined pose in the static posture.

* * * * *